United States Patent [19]
Christenberry

[11] Patent Number: 4,604,822
[45] Date of Patent: Aug. 12, 1986

[54] FISHING LURE HOLDER

[76] Inventor: S. Kent Christenberry, 200 NE. 46th St., Oklahoma City, Okla. 73105

[21] Appl. No.: 748,210

[22] Filed: Jun. 24, 1985

[51] Int. Cl.⁴ ............................................. A01K 97/06
[52] U.S. Cl. ...................................... 43/57.1; 211/89; 206/315.11
[58] Field of Search ........................... 43/57.1; 211/89; 248/110; 224/920; 206/315.11, 468, 488, 341

[56] References Cited

U.S. PATENT DOCUMENTS

| | | |
|---|---|---|
| D. 238,873 | 2/1976 | West . |
| 1,543,120 | 6/1925 | Raber et al. . |
| 2,081,817 | 5/1937 | Johnson . |
| 2,164,259 | 6/1939 | Schweigert . |
| 2,316,833 | 4/1943 | Baron . |
| 2,614,359 | 10/1952 | Galbraith et al. . |
| 2,629,965 | 3/1953 | Chew . |
| 2,691,843 | 10/1954 | Clayton . |
| 2,710,484 | 6/1955 | McGinnis . |
| 2,991,581 | 7/1961 | Fracassi ............................ 43/57.1 |
| 3,332,164 | 7/1967 | Parrett, Jr. . |
| 3,430,379 | 3/1969 | Wolfrum . |
| 3,507,071 | 4/1970 | Bryson . |
| 3,859,747 | 1/1975 | Proebstle . |
| 3,876,076 | 4/1975 | Hazelhurst ..................... 211/89 X |

Primary Examiner—Nicholas P. Godici
Assistant Examiner—Carmine Cuda
Attorney, Agent, or Firm—Laney, Dougherty, Hessin, Claro & Beavers

[57] ABSTRACT

A fishing lure holder for receiving and automatically locking hooks of fishing lures. The apparatus includes a base having an elongated portion defining a plurality of U-shaped slots therein and a locking plate having a plurality of L-shaped slots therein. The locking plate is movable between a closed position in which pairs of L-shaped and U-shaped slots overlap and an open position in which the slots are substantially aligned, defining a transversely extending gap between each pair. A hook-guiding surface extends from an apex of each L-shaped slot and a similar hook-guiding surface extends in a longitudinally opposite direction from an intermediate portion of each the U-shaped slot. The hook-guiding surfaces form normally extending hook-receiving grooves adjacent a longitudinal edge of the apparatus. A spring longitudinally biases the locking plate toward the closed position. In operation, a hook of a fishing lure is pressed transversely into a hook-receiving groove, forcing the locking plate toward the open position so that the hook is free to move toward the bottom of the corresponding slots. As the hook passes the apex of the L-shaped slot, the spring moves the locking plate back toward the closed position, thus clamping the hook between the U-shaped slot and the L-shaped slot.

16 Claims, 5 Drawing Figures

FISHING LURE HOLDER

BACKGROUND OF THE INVENTION

1. Field Of The Invention

This invention relates to fishing lure holders, and more particularly, to fishing lure holders which are spring actuated for automatically clamping the hooks of fishing lures.

2. Description Of The Prior Art

Holding apparatus for fishing lures which provides separation of the lures, maintains ready access, as well as minimizes the possibility of injury caused by the hooks thereof, has long been desirable. Some fishing lure holders which have been developed utilize biasing means to clamp the hook of the lure in place. One such device is shown in U.S. Pat. No. 2,081,817 to Johnson in which hooks are held in place by fitting in grooves between longitudinally positioned latching members and clamped therein by spring action. This device has more parts and is considerably more complicated than the apparatus of the present invention.

Fish hook holders having individual spring elements for each hook held thereby are disclosed in U.S. Pat. Nos. 2,629,965 to Chew and 2,691,843 to Clayton. Again, these devices are more complicated than the apparatus of the present invention which utilizes a single spring member for clamping all of the hooks held at one time.

U.S. Pat. No. 1,543,120 to Raber et al. discloses a sliding plate having a plurality of elongated slots therein positioned between a pair of stationary plates having similar slots. The sliding plate is spring biased in a transverse direction. When the springs are deflected, the slots in all three plates are aligned so that a hook may be placed therethrough. When the spring is released, the sliding plate moves transversely so that the slot opening is reduced, and the sliding plate clamps the hooks against the stationary plates. One disadvantage to such apparatus is that the sliding plate must be depressed by one hand before a hook may be installed with another hand. There is no way to simply snap the hook in place with one hand, as with the present invention.

A fishing lure holder without spring biasing is shown in U.S. Pat. No. Des. 238,873 to West, in which a stationary member has a plurality of substantially U-shaped slots with a movable member having a plurality of substantially L-shaped slots alignable with the slots in the stationary member. A linkage is used to move the movable member from a position in which a hook may be positioned through aligned slots and a closed position in which the hook is clamped between the slots. This design has disadvantages in that the movable member must be moved by hand prior to inserting a hook, and has no spring biasing to automatically lock the hooks in place or to keep a constant force on the lures once in position. The fishing lure holder of the present invention solves these problems in that it includes a hook-receiving groove adjacent the slots and uses spring biasing so that a hook may be pushed through the hook-receiving groove into the slots, with the apparatus automatically locking the hook in position.

SUMMARY OF THE INVENTION

The fishing lure holder of the present invention defines longitudinal, transverse and normal axes and comprises a first portion and a second portion adjacent the first portion in close relationship thereto. The first portion defines at least one substantially L-shaped slot therein extending from a longitudinal edge thereof and further having a first hook guiding surface extending from the L-shaped slot adjacent an inner apex thereof and intersecting the longitudinal edge of the first portion at a point longitudinally spaced from the L-shaped slot. The second portion defines a substantially U-shaped slot therein extending from a longitudinal edge of the second portion and further having a second hook guiding surface extending from the U-shaped slot and intersecting the longitudinal edge of the second portion at a point longitudinally spaced from the U-shaped slot. First and second hook guiding surfaces extend in longitudinally opposite directions from one another.

At least one of the portions is movable with respect to the other alternately between an open position, in which the L-shaped slot and U-shaped slot are substantially aligned such that a gap is defined therebetween in communication with the longitudinal edges of the first and second portions, and a closed position, wherein the L-shaped slot and U-shaped slot overlap such that the hook guiding surfaces define a hook receiving groove extending normally through the first and second portions. Preferably, a plurality of such slots and grooves are utilized.

The apparatus further comprises biasing means for biasing a movable portion toward the closed position. In operation, as a hook of a fishing lure is pressed into the hook receiving groove, the movable portion is forced to longitudinally move to the open position such that the hook may be transversely moved past the apex of the L-shaped slot, whereupon the biasing means returns the movable portion back toward the closed position for locking the hook between the U-shaped and L-shaped slots.

Preferably, the first portion is a stationary base, and the second portion is the movable portion in the form of a locking plate. The base includes an elongated portion extending in a longitudinal direction and defining the slot extending from an upper surface thereof. The base further includes a flange extending normally to the elongated portion at an end thereof. The locking plate also includes an elongated, longitudinally extending portion substantially parallel to the elongated portion of the base, and further has a flange extending normally to the elongated portion at an end thereof. A spring is positioned between the flanges so that the flange of the locking plate is longitudinally biased away from the flange of the base. A pin is attached to the flange of the locking plate, and the pin extends axially through the spring and through a hole in the flange of the base for guidance therewith.

Also in the preferred embodiment, the base defines at least one longitudinally extending slot in the elongated portion thereof, and the locking plate includes a pin extending normally from its elongated portion and through the slot in the elongated portion of the base for guidance therewith as the locking plate is moved between the closed and open positions. A boss extends from an end of the pin opposite the elongated portions so that the pin cannot be removed from the slot, thus limiting movement in a normal direction between the locking plate and the base as well as transverse movement therebetween.

A longitudinally disposed mounting foot extends from the transverse flange of the base. The foot has a hold therethrough for receiving a fastener to mount the apparatus to a support surface, such as a boat. Preferably, there is a transverse flange at each end of the base portion and a longitudinal mounting foot extending outwardly from each flange.

An important object of the fishing lure holder of the present invention is to provide an apparatus for holding fishing lures in which the lures may be locked therein by movement of only one hand of the user.

Another object of the invention is to provide a fishing lure holder having a spring-biased locking means for holding the hook of a fishing lure.

A further object of the invention is to provide a fishing lure holder having few parts.

Still another object of the invention is to provide a fishing lure holder which allows easy insertion of a fishing lure, but prevents accidental removal of the lures held thereby.

Additional objects and advantages of the invention will become apparent as the following detailed description of the preferred embodiment is read in conjunction with the accompanying drawings which illustrate such preferred embodiment.

DETAILED DESCRIPTION OF THE PREFERRED EMBODIMENT

Figure 1:
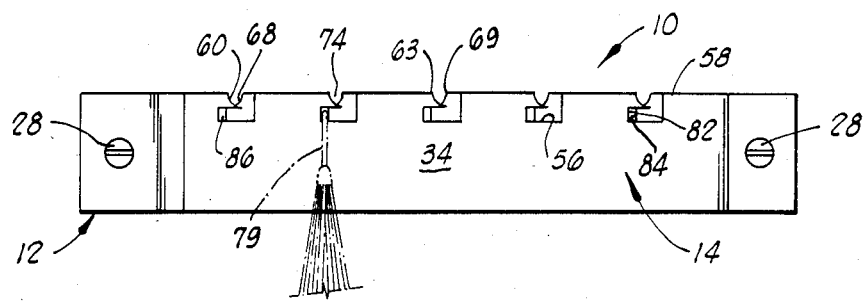
FIG. 1 shows an elevation view of the fishing lure holder of the present invention, in which a longitudinal axis extends horizontally and a transverse axis thereof extends perpendicular to the longitudinal axis.

Referring now to the drawings, the fishing lure holding apparatus of the present invention is shown and generally designated by the numeral 10. Apparatus 10 includes a first portion in the form of a base 12 and a second portion in the form of a locking plate 14.

Base 12 includes an elongated, longitudinally extending portion 16 with substantially parallel flanges 18 and 20 extending normally therefrom at opposite ends thereof. Extending longitudinally outwardly from, and substantially perpendicularly to, flange 18 is a first mounting foot 22, and similarly extending from flange 20 is a second mounting foot 24. Mounting feet 22 and 24 are adapted to attach to any convenient mounting or support surface 26, such as the interior side of a boat. Such attachment may be by any means known in the art such as fasteners 28 extending through holes 30 and 32 in the mounting feet. Gluing or any other attachment means could be alternatively used.

Figure 2:
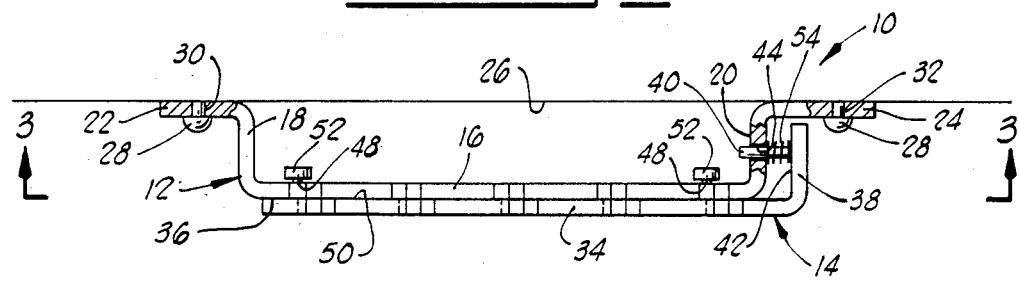
FIG. 2 shows a plan elevation of the apparatus in which the longitudinal axis also extends horizontally and a normal axis extends perpendicular to the longitudinal axis.

Locking plate 14 includes an elongated, longitudinally extending portion 34 which extends substantially parallel to elongated portion 16 of base 12 in close relationship thereto. Locking plate 14 is longitudinally movable with respect to base 12. As shown in FIG. 2, elongated portion 34 of locking plate 14 and elongated portion 16 of base 12 define a sliding surface of contact 36 therebetween. It will be clear to those skilled in the art that sliding contact is not required, and elongated portion 34 could be spaced slightly apart from elongated portion 16.

Locking plate 14 further includes a flange 38 extending normally from an end of elongated portion 34. Flange 38 is substantially parallel to flange 20 of base 12. Flange 38 has a pin 40 extending longitudinally from an inner surface 42 thereof and through a hole 44 in flange 20. Pin 40 thus is guided by hole 44 as locking plate 14 is longitudinally moved.

Figure 3:
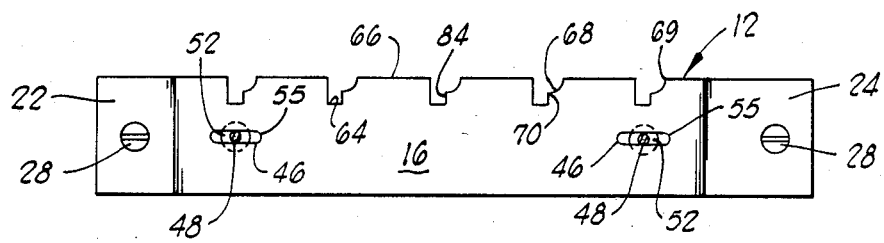
FIG. 3 is a section view taken along lines 3—3 in FIG. 2.

In FIG. 3 it will be seen that elongated portion 16 of base 12 defines a pair of longitudinally disposed slots 46 therethrough. Referring also to FIG. 2, a pair of pins 48 extend normally from inner surface 50 of elongated portion 34 of locking plate 14. Each pin 48 extends through a corresponding slot 46 so that transverse movement of locking plate 14 is limited. A boss 52 on the end of each pin opposite elongated portion 34 also limits the movement in a normal direction between locking plate 14 and base 12.

Still referring to FIG. 2, a coil spring 54 is positioned around pin 40 and is substantially coaxial therewith. It will be clear to those skilled in the art that spring 54 acts as a biasing means to force flange 38 of movable locking plate 14 away from flange 20 of stationary base 12. Maximum longitudinal movement of locking plate 14 occurs when pins 48 contact ends 55 of corresponding slots 46 nearest spring 54.

Referring now to FIGS. 1, 3, 4 and 5, elongated portion 34 of locking plate 14 defines a plurality of substantially L-shaped slots 56 extending transversely from longitudinal edge 58 thereof. A first hook-guiding surface 60 extends from an inner apex 62 of each L-shaped slot 56 and intersects longitudinal edge 58 at a point 63 longitudinally spaced from the L-shaped slot. Although surface 60 is shown in the preferred embodiment to intersect apex 62, it is only necessary that the surface intersect L-shaped slot 56 at some transversely intermediate point. Preferably, surface 60 is concavely curvilinear. However, it will be obvious to those skilled in the art that a convex curvilinear surface, straight angular surface, or any other guiding surface would be satisfactory.

Elongated portion 16 of base 12 defines a plurality of substantially U-shaped slots 64 therein extending from a longitudinal edge 66 thereof. A second hook-guiding surface 68 extends from a side of each U-shaped slot 64 at a transversely intermediate point 70 thereof and intersects longitudinal edge 66 at a point 69 longitudinally spaced from the U-shaped slot. Preferably, surface 68 is also concavely curvilinear, but other shapes would be satisfactory as with surface 60. Each pair of first and second surfaces 60 and 68 extend in longitudinally opposite directions from one another.

Figures 4, 5:
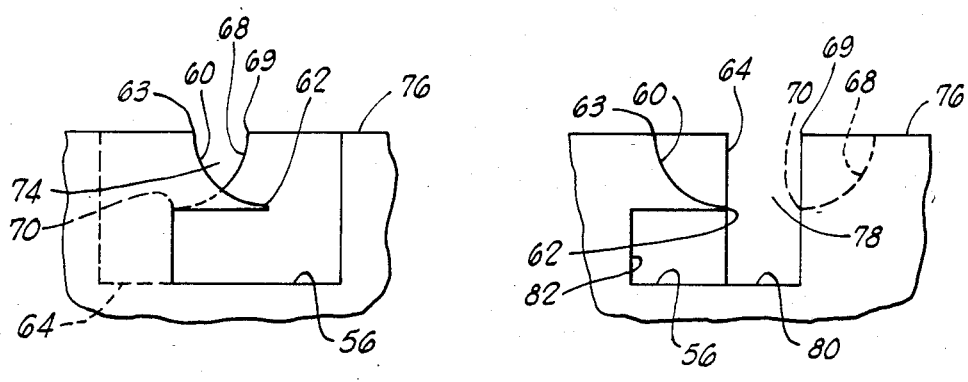
FIG. 4 is an enlarged detail of the slots and hook-receiving groove when in a locking position.
FIG. 5 is an enlarged view of the slots and groove when the apparatus is in a fully open position.

When flange 38 of locking plate 14 is biased to its maximum longitudinal distance from flange 20 of base 12, as described above, the locking plate is in a closed position with respect to the base, as shown in FIG. 4. Also, when apparatus 10 is in this closed position, hook-guiding surfaces 60 and 68 are adjacent so that a substantially V-shaped hook-receiving groove 74 is defined thereby, extending normally along longitudinal edges 58 and 66.

FIG. 5 shows a fully open position of apparatus 10 in which flange 38 of locking plate 14 is displaced longitudinally toward flange 20 of base 12, thus deflecting spring 54. In this open position, L-shaped slots 56 and U-shaped slots 64 are substantially aligned so that an upwardly opening gap 78 is defined therebetween in communication with longitudinal edges 58 and 66.

As a hook of a lure 79 is pressed downwardly, or transversely, into groove 74, the force exerted by spring 54 is overcome such that locking plate 14 moves longitudinally toward the open position. Maximum longitudinal displacement due to the hook occurs as the hook reaches apex 62 and intermediate point 70. As the hook is further transversely moved past apex 62 toward bottom 80 of gap 78, spring 54 moves locking plate 14 back toward the closed position with snap action. The hook prevents complete return, and thus is clamped between transverse side 82 of L-shaped slot 56 and transverse side 84 of U-shaped slot 64 in an enclosed opening 86 formed therebetween. This clamping or locking position is shown in FIG. 1.

Thus, lure 79 can be locked easily and automatically into apparatus 10 by using only one hand. However, the hook, once clamped in apparatus 10, cannot be as easily dislodged. To remove lure 79 from the apparatus, it is necessary to manually longitudinally deflect flange 38 of locking plate 14 toward flange 20 of base 12. Thus, a hook of fishing lure 79 is easily installed and locked in position, but a deliberate action of the user is necessary to remove the hook therefrom. In this way, lures 79 cannot be accidentally dislodged or entangled with one another.

It can be seen, therefore, that the fishing lure holding apparatus of the present invention is well adapted to carry out the objects and attain the ends and advantages mentioned, as well as those inherent therein. While a presently preferred embodiment of the invention has been described for the purposes of this disclosure, numerous changes in the construction and arrangement of parts may be made by those skilled in the art. All such changes are encompassed within the scope and spirit of this invention as defined by the appended claims.

What is claimed is:

1. A fishing lure holding apparatus having a longitudinal axis, a transverse axis and a normal axis, comprising:
    a first portion defining a substantially L-shaped slot therein extending from a longitudinal edge thereof and further having a surface extending from said L-shaped slot adjacent an inner apex thereof and intersecting said longitudinal edge at a point longitudinally spaced from said L-shaped slot;
    a second portion adjacent said first portion, said second portion defining a substantially U-shaped slot therein extending from a longitudinal edge of said second portion and further having a surface extending from said U-shaped slot and intersecting said longitudinal edge of said second portion at a point longitudinally spaced from said U-shaped slot, wherein at least one of said portions is alternately movable with respect to the other portion between an open position, in which said L-shaped slot and said U-shaped slot are substantially aligned such that a gap is defined therebetween in communication with said longitudinal edges of said first and second portions, and a closed position, wherein said L-shaped slot and said U-shaped slot overlap such that said surfaces define a hook-receiving groove normally through said first and second portions; and
    biasing means for biasing said movable portion toward said closed position;
    whereby, as a hook of a fishing lure is pressed into said hook-receiving groove, said movable portion is forced to move to said open position such that said hook may be moved transversely past said apex of said L-shaped slot, whereupon said biasing means returns said movable portion back toward said closed position for locking said hook between said U-shaped slot and said L-shaped slot.

2. The apparatus of claim 1 wherein said surfaces are curvilinear and extend concavely away from one another.

3. The apparatus of claim 1 wherein the non-moving portion comprises means for attachment to a mounting surface.

4. The apparatus of claim 1 wherein said biasing means comprises a spring.

5. A fishing lure holder comprising:
    a base portion;
    a locking plate portion adjacent said base portion and longitudinally movable with respect thereto, wherein:
        one of said base and locking plate portions defines a substantially L-shaped slot extending from an edge thereof, and further includes a concave curvilinear surface extending from an apex of said slot and intersecting said edge; and
        the other of said base and said locking plate portions defines a substantially U-shaped notch extending from an edge of said other portion adjacent said first-mentioned edge, and further having a concave curvilinear surface extending from said U-shaped slot in a direction opposite said first-mentioned curvilinear surface and intersecting said edge of said other portion;
        whereby, said curvilinear surfaces define a substantially V-shaped hook-receiving groove, extending in a normal direction through said base and locking plate portions adjacent said edges thereof, when said portions are in a closed position, and said portions define an open position in which said U-shaped slot and said L-shaped slot are in substantial alignment defining
    a gap therebetween in communication with said edges; and
    biasing means for continuously biasing said movable portion from said open toward said closed position;
    whereby, as a hook of a fishing lure is transversely moved into said hook-receiving groove, said movable portion will be longitudinally moved from said closed position to said open position such that said hook may be transversely moved past said apex of said L-shaped slot so that said locking plate portion will be moved toward said closed position by said biasing means for locking said hook between said U-shaped slot and said L-shaped slot.

6. The apparatus of claim 5 wherein said base portion comprises mounting means for mounting to a support surface.

7. The apparatus of claim 5 wherein:
    said base portion comprises an elongated portion and a flange substantially perpendicular to said elongated portion;
    said locking plate portion comprises an elongated portion adjacent, and substantially parallel to, said base elongated portion and a flange substantially perpendicular to said locking plate elongated portion; and said biasing means is characterized as a spring disposed between said flanges.

8. The apparatus of claim 7 wherein:
one of said flanges defines a hole therethrough; and
the other of said flanges includes a pin attached thereto, said pin extending axially through said spring and further extending through said hole for guidance therewith.

9. The apparatus of claim 5 wherein:
one of said portions defines an elongated slot therethrough;
the other of said portions defines a pin extending therefrom and through said slot for guidance therewith; and
further comprising a boss attached to an end of said pin opposite said other portion, said boss preventing substantial transverse and normal movement between said base and locking plate portions.

10. An apparatus for holding and securing hooks of fishing lures, said apparatus comprising:
a base comprising:
an elongated, longitudinally extending portion;
at least one transverse flange extending from an end of said elongated portion; and
a longitudinally disposed mounting foot extending from said transverse flange;
a locking plate longitudinally movable with respect to said base portion and comprising:
an elongated, longitudinal portion extending substantially parallel to said base elongated portion and positioned in close relationship thereto; and
a transverse flange extending from an end of said locking plate elongated portion and substantially parallel to said base flange; and
a spring positioned between said base flange and said locking plate flange for longitudinally biasing said flanges apart;
wherein:
one of said elongated portions of said base and said locking plate defines a transversely extending, substantially L-shaped slot therein and further defining a surface interconnecting an apex of said slot with a longitudinal edge of said elongated portion;
the other of said elongated portions defines a transversely extending, substantially U-shaped slot and further having a surface interconnecting an intermediate portion of said U-shaped slot with a longitudinal edge of said other elongated portion; and
said elongated portion of said locking plate being positionable in an open position, wherein said U-shaped slot and said L-shaped slot are in substantial alignment defining a transverse gap therebetween extending from said longitudinal edges, and a closed position, wherein said L-shaped slot and said U-shaped slot substantially overlap and said surfaces define a hook-receiving groove therebetween extending normally along said longitudinal edges.

11. The apparatus of claim 10 further comprising means for longitudinally guiding said locking plate during said longitudinal movement thereof and for substantially preventing transverse and normal movement thereof.

12. The apparatus of claim 11 wherein said means for longitudinally guiding said locking plate is characterized by:
a longitudinally extending slot in one of said elongated portions; and
a pin extending normally from the other of said elongated portions and extending through said slot; and
further comprising a boss on an end of said pin opposite said other elongated portion.

13. The apparatus of claim 10 wherein said L-shaped slots are in said locking plate and said U-shaped slots are in said base.

14. The apparatus of claim 10 wherein said surfaces are curvilinear.

15. In a fishing lure holder of a type having a pair of longitudinally extending portions, one of said portions defining a transversely extending L-shaped slot therein and the other of said portions defining a transversely extending U-shaped slot therein, one of said portions being movable so that said slots are positionable for locking a hook of a fishing lure therebetween, the improvement comprising:
a first surface interconnecting an apex of said L-shaped slot and a longitudinal edge of the corresponding longitudinally extending portion;
a second surface interconnecting an intermediate portion of said U-shaped slot with a longitudinal edge of the other longitudinally extending portion, such that said first and second surfaces define a hook-receiving groove extending normally with respect to said longitudinally extending portions adjacent said longitudinal edges; and
biasing means for biasing said movable portion toward a hook locking position, such that as a hook is moved transversely in said groove, said movable portion is moved toward an open position in which said hook may be moved past an apex of said L-shaped slot, whereupon said biasing means will return said movable portion to said locking position.

16. The apparatus of claim 15 wherein said surfaces are curvilinear and extend concavely away from one another.

* * * * *